United States Patent [19]
Herrmann

[11] 3,730,349
[45] May 1, 1973

[54] ION EXCHANGE FILTER PARTICULARLY A MINIATURE FILTER

[76] Inventor: Willy Herrmann, Strombergstrasse 21, Ludwigsburg, Germany

[22] Filed: Apr. 8, 1971

[21] Appl. No.: 132,275

[30] Foreign Application Priority Data

Apr. 29, 1970 Germany.....................P 20 20 929.4
Aug. 14, 1970 Germany....................G 70 30 537.2

[52] U.S. Cl. ....................210/281, 210/282, 210/289
[51] Int. Cl. ............................................B01d 27/02
[58] Field of Search......................210/266, 281, 282, 210/283, 287, 288, 289, 291, 292, 293

[56] References Cited

UNITED STATES PATENTS

| | | | |
|---|---|---|---|
| 3,554,377 | 1/1971 | Miller | 210/283 X |
| 1,557,117 | 10/1925 | Sweeney | 210/293 X |
| 661,339 | 11/1900 | Grever | 210/283 X |
| 2,525,497 | 10/1950 | Monfried | 210/293 X |
| 690,333 | 12/1901 | Wanner, Jr. | 210/283 X |

Primary Examiner—Samih N. Zaharna
Attorney—John J. McGlew and Alfred E. Page

[57] ABSTRACT

The filter includes a container filled with ion exchange material and has an upper opening, with the liquid to be treated flowing longitudinally upwardly through the container from a bottom inlet. The container has a bottom wall and sidewalls extending upwardly from the bottom wall and with upper ends converging inwardly to the upper opening. At least one plate, having lateral dimensions substantially equal to the inner lateral dimensions of the container adjacent the bottom wall, is positioned on the bottom wall and has openings for the passage of liquid to be treated. The plate is formed of material which is sufficiently flexible to provide for the plate to be inserted through the upper opening into the container. In one embodiment of the invention, a single flexible plate has elevations on its surface toward the bottom wall, spacing the plate from the bottom wall. In another embodiment of the invention, a second plate of sponge-like material is positioned on top of the first plate. In a third embodiment of the invention, only a plate of sponge-like material is used and the inner surface of the bottom wall is formed with a series of concentric discontinuous annular ribs.

9 Claims, 6 Drawing Figures

PATENTED MAY 1 1973　　3,730,349

Inventor
WILLY HERRMANN
BY
McGlew & Tuttle
ATTORNEYS 3,730,349

ION EXCHANGE FILTER PARTICULARLY A MINIATURE FILTER

BACKGROUND OF THE INVENTION

Miniature ion exchange filters are used, for example, in automotive establishments, for filling automobile batteries, and in chemical laboratories, pharmacies, etc., to make pure water available when required. After exhaustion of the ion exchange substance or material, the cartridge-like miniature filters are sent to a collecting station where the resins are regenerated.

Filter containers of this type, as used heretofore, comprise a flat container in whose bottom wall, integrally molded to the container shell, there is provided an inlet line for the raw water. The exchange resins rest directly on the bottom wall of the container. Filters of this type have the disadvantage that the raw water is not evenly distributed over the bottom wall of the container, and consequently does not flow evenly through the ion exchange material, so that the quality of the water at the outlet of the filter suffers considerably. The exchange resins cannot be utilized efficiently, because "dead spaces" form in the containers and through which the water to be treated does not flow.

To avoid these disadvantages, it is known to design the bottom wall of the container in the form of an insert insertable into the container shell, the peripheral edge of the bottom wall being joined to the container shell in a suitable manner, such as by glueing. This two-part design of the container has the advantage that a grate, with uniform openings for the passage of the water, can be placed on the bottom wall before the bottom wall is joined to the container shell. This assures uniform penetration of the container cavity by the water flowing in through the bottom inlet. However, the production of such a container is expensive, because the hollow shell and the bottom insert are produced separately and are then joined together to form a unit. While the hollow shell is produced by the injection blowing method, the bottom insert involves a deep drawn part.

SUMMARY OF THE INVENTION

This invention relates to ion exchange filters, particularly miniature filters, for the treatment of water, such as by softening, complete desalination, or both, and, more particularly, to such an ion exchange filter which is free of the disadvantages of the prior art, which is easy and inexpensive to produce, and which assures perfect operation of the filter with good utilization of the ion exchange substance or material.

In accordance with the invention, this problem is solved in that there is disposed, on the bottom wall of the container which has sidewalls whose upper ends converge inwardly to an upper opening, at least one plate of flexible material formed with openings for the passage of the liquid to be treated, and having dimensions substantially equal to the inside lateral dimensions of the container adjacent the bottom wall. For this purpose, the ion exchange container may comprise a hollow plastic shell produced by the blowing or injection blowing method and in which the bottom is molded so as to form an integral part thereof, which nevertheless presents a grate for the uniform distribution of water and for the uniform seating of the package of chemicals. Due to the flexibility of its material, the grate can be introduced in rolled-up condition through the neck of the container and then placed on the bottom wall of the container. Such a grate may comprise, for example, a rubber plate formed with uniformly distributed openings for the passage of water.

To provide for uniform distribution of water flowing into the bottom area through the flexible plate, it is expedient for the flexible plate to be formed with elevations, such as molded-in projections, ribs or the like, oriented toward the bottom wall of the container.

In accordance with a preferred embodiment of the invention, there is a second, flexible plate, comprising a soft-elastic, porous member resembling a sponge, disposed on the first flexible plate. This makes it possible simultaneously for this second member to compensate for shrinkage developing with increasing exhaustion of the ion exchange material, or for the formation of canals caused by the flow, or for relayering of the ion exchange particles. These all have an unfavorable effect on the purity of the water. The exchange material may rearrange itself, when shrinking, and may cake due to the formation of canals, thereby utilizing the resin less and impairing the quality of the outlet water.

The effect of the soft-elastic member, resembling a sponge, is that if it is compressed by a fresh charge, it compensates for the shrinkage of the exchange material by increasing its volume. By the same token, the formation of canals is completely avoided. This sponge-like compressible member so adapts to the respective swelling condition of the exchange material that it will always fill out the space available to it in the container, densely and without substantial relayering of the exchange particles. As soon as the exchange particles shrink or rearrange themselves, due to the flow, the volume of the sponge-like member changes so that a static counter-pressure is always exerted upon the exchange material.

It is not absolutely necessary for another, or first, flexible plate to be disposed below the sponge-like member. The sponge-like member per se may also serve for the seating. In such case, it is expedient, for the uniform distribution of water, when the bottom wall of the container, on its surface toward the interior of the container, is provided with molded-on ribs or the like so that the water flow is uniform.

An object of the invention is to provide an ion exchange filter which is simple and inexpensive to produce.

Another object of the invention is to provide an ion exchange filter which assures perfect operation of the filter with good utilization of the exchange material.

A further object of the invention is to provide an ion exchange filter assuring uniform distribution of the entering water throughout the cross-sectional area of the ion exchange material.

For an understanding of the principles of the invention, reference is made to the following description of typical embodiments thereof as illustrated in the accompanying drawing.

DESCRIPTION OF THE PREFERRED EMBODIMENTS

Figure 1:
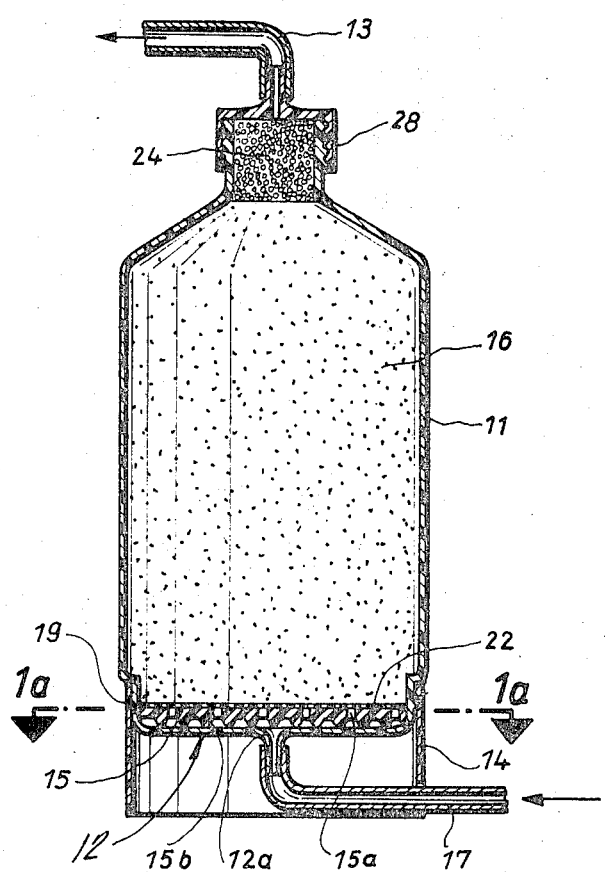
FIG. 1 is a vertical sectional view of an ion exchange filter embodying the invention and in the form of a cartridge.

FIG. 1 illustrates a container 11, for the ion exchange material 16, and which container has the shape of a bottle. Container 11 is a one-piece plastic, hollow body whose side walls converge toward each other at their upper ends to form a bottle neck. A cap 28 is screwed to this neck, and has an outlet nipple to which there is attached a discharge line 13 for the pure water. Inserted in the bottle neck there is a stopper 24 of a porous material which permits passage of the flowing water but blocks passage of the exchange material.

The raw water to be treated enters at the bottom wall 12 of container 11, through a hose 17 secured to a molded-on nipple 12a. The container stands on a shrunk-on plastic annular part 14 which has, at its upper edge, an annular groove into which there snaps a bead 19 extending around and molded into the periphery of the side wall of container 11.

Figure 1A:
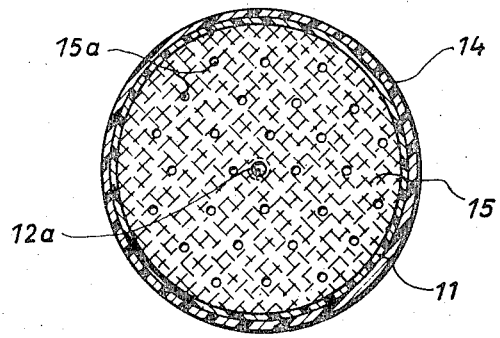
FIG. 1a is a top plan view of the bottom wall of the filter container, taken along the line 1a—1a of FIG. 1 and looking in the direction of the arrows.

A plate 15, of rubber or rubber-like material, such as plastic, lies on the bottom wall of container 11. Plate 15 has honeycomb-shaped impressions, with downwardly oriented elevations 15b, so that cavities are formed through which the water entering through line 17 can distribute itself evenly over the entire bottom area. The water then flows through openings 15a, shown in FIG. 1a, into the interior of container 11 and flows uniformly through the ion exchange filling 16 to discharge through line 13 as pure water. Bottom plate 15 is introduced into container 11 in the rolled-up condition, through the neck of the container, as by using a pair of tweezers. After passage through the narrow neck, plate 15 straightens out and seats itself effortlessly on the bottom wall of container 11. In order to prevent penetration of exchange material 16 through openings 15a, for the passage of water, a water-permeable screen 22, such as a textile screen, may rest on top of plate 15.

Figure 2:
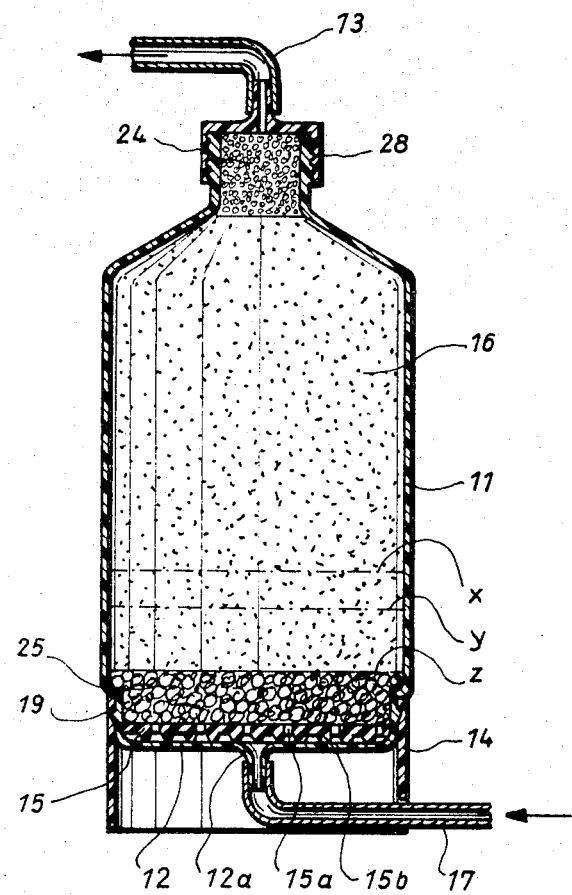
FIG. 2 is a view similar to FIG. 1 illustrating a modified filter having two flexible plates on its bottom wall.

In a preferred embodiment of the invention shown in FIG. 2, parts identical with those in FIG. 1 have the same reference characters applied thereto. In this embodiment, there is positioned, on first plate 15, a flexible member 25 which resembles a sponge and which is compressible to a considerable extent. In the illustrated operating condition, in which ion exchange material 16 is freshly regenerated, the spongy member 25 is compressed to the extent indicated by the line z. When the exchange substance becomes exhausted and shrinks, spongy member 25 compensates for this shrinkage by expanding upwardly. Thus, member 25, whose free height is near the line x when no ion exchange material has been filled into container 11, may occupy the space up to the line marked y when the exchange material is exhausted. Thereby, there is practically no relayering occuring, because the exchange material is always under a static pressure. Experience has shown that the efficiency of the ion exchange filter and, with such efficiency, the quality of the water, are substantially improved by the spongy member 25.

Since member 25 is porous, uniform passage of the water through this member into the interior of container 11 is assured. However, the uniform water throughput can be increased when the mentioned first plate 15 is inserted between the bottom wall 12, of container 11, and the spongy member 25. Member 25 also is flexible and can be introduced without effort through the neck of the container, so that the container again may comprise a single integral hollow piece.

Figure 3:
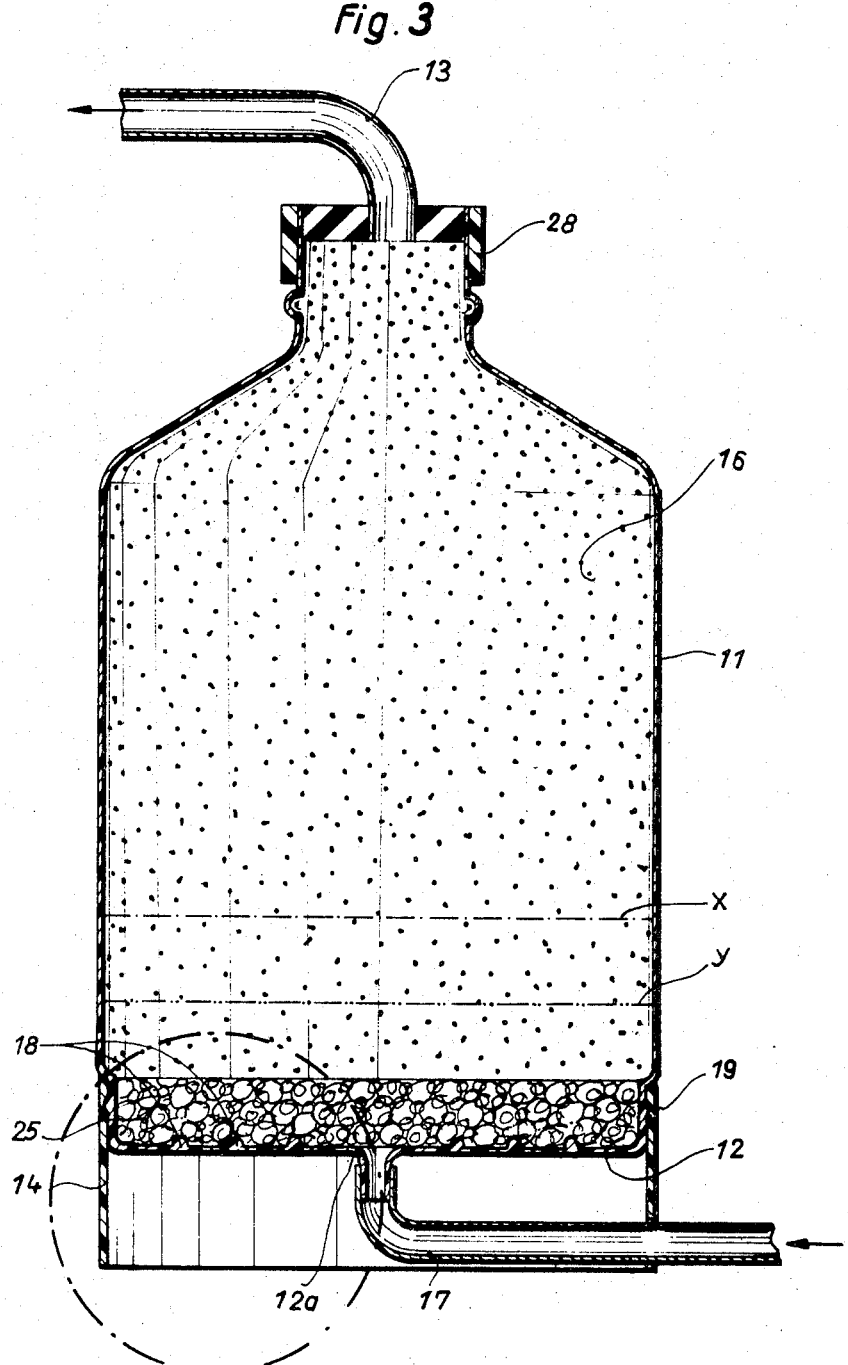
FIG. 3 is a view similar to FIG. 1 but illustrating a further modified form of filter embodying the invention.
Figure 4:
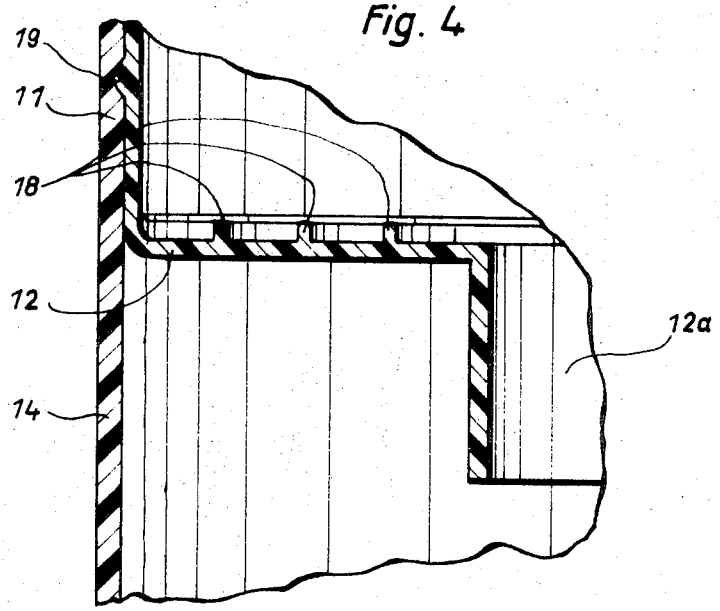
FIG. 4 is a partial vertical sectional view, to an enlarged scale, of the area encircled in FIG. 3.
Figure 5:
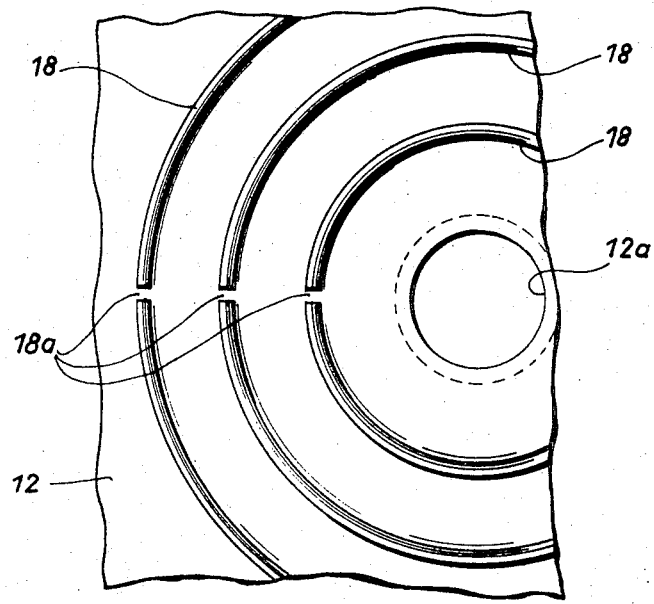
FIG. 5 is a top plan view corresponding to FIG. 4.

As illustrated in the embodiment of FIGS. 3, 4 and 5, the first plate 15 also may be eliminated. To assure uniform flow of water over the entire bottom area in this embodiment of the invention, it is expedient for the bottom wall to be formed, on its inner surface, with rib-shaped and preferably annular elevations 18, which are expediently provided with interruptions 18a, as shown in FIG. 5, for the purpose of water passage. The annular ribs 18 preferably are concentric with each other and with the inlet nipple 12a. In this manner, good seating of spongy member 25 on bottom wall 12 is possible and, in addition, the arrangement permits a uniform penetration of the water entering through nipple 12a.

To regenerate exchange material 16, the latter is emptied from container 11 through the upper opening, and returned to the container again, through this opening, after regeneration.

It has been found to be expedient if also the stopper 24, of FIGS. 1 and 2, comprises a soft-elastic, porous, compressible material, so that a counter-pressure is also exerted on the exchange material by stopper 24 in the event of shrinking or contraction of the bed of exchange material. This counter-pressure is particularly effective when receptacle or container 11 is formed to be a uniform diameter cylinder, in which case the body 24 has a radius corresponding approximately to that of the plate 25 supported on the bottom wall 12.

While specific embodiments of the invention have been shown and described in detail to illustrate the application of the principles of the invention, it will be understood that the invention may be embodied otherwise without departing from such principles.

I claim:

1. In an ion exchange filter, particularly a miniature filter, for the treatment of water by softening, complete desalination, or both, and of the type including a container, filled with ion exchange material, and having an upper opening, with the liquid to be treated flowing longitudinally upwardly through the container from a bottom inlet, the improvement comprising, in combination, said container having a flat bottom wall and side walls integral with said bottom wall and extending upwardly from said bottom wall with upper ends converging inwardly to said upper opening; and at least one substantially flat plate on said bottom wall, supporting said ion exchange material, having lateral dimensions substantially equal to the inner lateral dimensions of said container adjacent said bottom wall, and having openings for the passage of the liquid to be treated; said plate being formed of material which is sufficiently flexible to provide for said plate to be inserted through said upper opening into said container; one of said plate and said bottom wall having elevations spacing said plate from said bottom wall for flow of water from said bottom inlet through said plate.

2. In an ion exchange filter, the improvement claimed in claim 1, in which said plate has elevations oriented toward the bottom wall of said container to provide space for uniform distribution of the entering liquid over said bottom wall.

3. In an ion exchange filter, the improvement claimed in claim 2, in which said elevations are spaced projections.

4. In an ion exchange filter, the improvement claimed in claim 2, in which said elevations are spaced ribs.

5. In an ion exchange filter, the improvement claimed in claim 1, including a second flexible plate of a soft-elastic porous sponge-like material positioned on said first-mentioned flexible plate.

6. In an ion exchange filter, the improvement claimed in claim 1, in which said plate is formed of a soft-elastic sponge-like material which, upon a fresh charge of ion exchange material into said container, is very substantially compressed longitudinally of said container by the fresh charge and, with increasing exhaustion of the ion exchange material, expands longitudinally of said container to compensate for the shrinkage of the ion exchange material; the inner surface of the bottom wall of said container having elevations spacing said plate above said inner surface.

7. In an ion exchange filter, the improvement claimed in claim 6, in which said elevations are ribs molded integrally with said bottom wall on its inner surface.

8. In an ion exchange filter, the improvement claimed in claim 6, in which said plate is formed of foamed plastic material.

9. In an ion exchange filter, the improvement claimed in claim 1, including a soft-elastic, compressible, porous, sponge-like body positioned in said container above the ion exchange material.

* * * * *